United States Patent
Kagaya (10) Patent No.: US 9,380,281 B2
(45) Date of Patent: Jun. 28, 2016

(54) IMAGE PROCESSING APPARATUS, CONTROL METHOD FOR SAME, AND PROGRAM

(71) Applicant: CANON KABUSHIKI KAISHA, Tokyo (JP)

(72) Inventor: Sosuke Kagaya, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/953,968

(22) Filed: Jul. 30, 2013

(65) Prior Publication Data

US 2014/0044420 A1 Feb. 13, 2014

(30) Foreign Application Priority Data

Aug. 13, 2012 (JP) ................................. 2012-179591
Jul. 11, 2013 (JP) ................................. 2013-145490

(51) Int. Cl.

| | |
|---|---|
| H04N 5/783 | (2006.01) |
| H04N 9/80 | (2006.01) |
| H04N 9/87 | (2006.01) |
| H04N 9/82 | (2006.01) |
| H04N 21/472 | (2011.01) |
| H04N 21/4728 | (2011.01) |
| H04N 21/81 | (2011.01) |
| H04N 13/00 | (2006.01) |

(52) U.S. Cl.
CPC ................ *H04N 9/87* (2013.01); *H04N 5/783* (2013.01); *H04N 9/8227* (2013.01); *H04N 13/0022* (2013.01); *H04N 21/4728* (2013.01); *H04N 21/47217* (2013.01); *H04N 21/816* (2013.01)

(58) Field of Classification Search
USPC .......................... 386/239–248, 341, 343–357
See application file for complete search history.

(56) References Cited

U.S. PATENT DOCUMENTS

| | | | | |
|---|---|---|---|---|
| 2010/0066812 A1* | 3/2010 | Kajihara et al. | ................ | 348/46 |
| 2012/0099843 A1* | 4/2012 | Katayama et al. | ............ | 386/353 |
| 2012/0170909 A1* | 7/2012 | Chung et al. | .................. | 386/248 |

FOREIGN PATENT DOCUMENTS

| | | |
|---|---|---|
| JP | 2009-159357 A | 7/2009 |
| JP | 2011-097451 A | 5/2011 |

OTHER PUBLICATIONS

Kim, Changil et al.,Multi-Perspective Stereoscopy from Light Fields, Proceedings of the 2011 ACM SIGGRAPH Asia Conference, Dec. 11.*

\* cited by examiner

*Primary Examiner* — Hung Dang
(74) *Attorney, Agent, or Firm* — Fitzpatrick, Cella, Harper & Scinto (57) ABSTRACT

An image processing apparatus replays moving image data and includes a control unit configured to carry out control that replays the moving image data; and a generating unit configured to generate images in the case of different depths of field based on the moving image data depending on a replay speed of the moving image data.

16 Claims, 11 Drawing Sheets

IMAGE PROCESSING APPARATUS, CONTROL METHOD FOR SAME, AND PROGRAM

BACKGROUND OF THE INVENTION

1. Field of the Invention

The present invention relates to an image processing technique that enables replay after changing the focus state of a moving image.

2. Description of the Related Art

In recent years, imaging apparatuses referred to as a "light-field camera" have been practically implemented. The imaging apparatus divides incident light into multiple light components by a micro lens array arranged on an image sensor so that the imaging apparatus can obtain light beam information by capturing light traveling in a plurality of directions. After shooting, the imaging apparatus executes predetermined calculation processing based on the intensity of light and the light incident direction so that an image with any focal distance and any depth of field (hereinafter collectively referred to as "focus information") can be configured. The advantage of the light-field camera is that any image can be configured by executing calculation processing after shooting by utilizing light beam information (hereinafter, referred to as an "LF camera"). There are similar advantages during moving shooting using an LF camera, and reconstructing image data during replay after moving shooting and executing moving image replay that reflects arbitrary focus information are possible.

Conventionally, a technique in which a separate image is displayed during fast forward of a moving image is known. In the technique disclosed in Japanese Patent Laid-Open No. 2011-97451, when carrying out fast forwarding of a 3D (3-dimensional) moving image, a 2D (2-dimensional) image is displayed in order to improve viewability. Japanese Patent Laid-Open No. 2009-159357 discloses that after shooting, the depth of field of the image can be adjusted, and the blur state can be adjusted.

However, with respect to moving images captured by the LF camera, in the case in which a user searches for a desired scene by executing fast forward replay and the like, overlooking a scene can occur due to the setting of the focus information. This is because, in the case in which a user is viewing a moving image in a state of focusing on a particular depth in the image, recognizing a subject outside the focus area is difficult. Thus, the user must also pay close attention so as not to overlook a desired scene in an area that is not in focus.

In Japanese Patent Laid-Open No. 2011-97451, although a 2D image is displayed in order to improve the viewability during fast forward playback, recognition of a subject outside a focus area is not taken into consideration in an image for which arbitrary focus information can be specified. In a method of switching from a 3D display to a 2D display, because the focus information itself does not change, the problem of recognizing of a subject outside of the focus area cannot be solved.

SUMMARY OF THE INVENTION

The present invention provides an image processing apparatus that enables replaying a moving image after changing the focus state of the moving image, to make recognizing a subject by a user easy by controlling the focus state according to the replay speed.

In order to solve this problem, the apparatus according to the present invention is an image processing apparatus that reconstructs and replays image data in a specified focus state, wherein the image processing apparatus is provided with an image generating unit that generates first image data for which a focus state has been specified and second image data in which a plurality of subjects is in focus; and a control unit that carries out control in which second image data is generated by the image generating unit and replayed in the case in which the replay speed is equal to or greater than a threshold value, and the first image data is generated by the image generating unit and replayed in the case in which the replay speed is less than a threshold value.

According to the present invention, a subject can be easily recognized by controlling the focus state depending on the replay speed.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings.

Figure 1A:
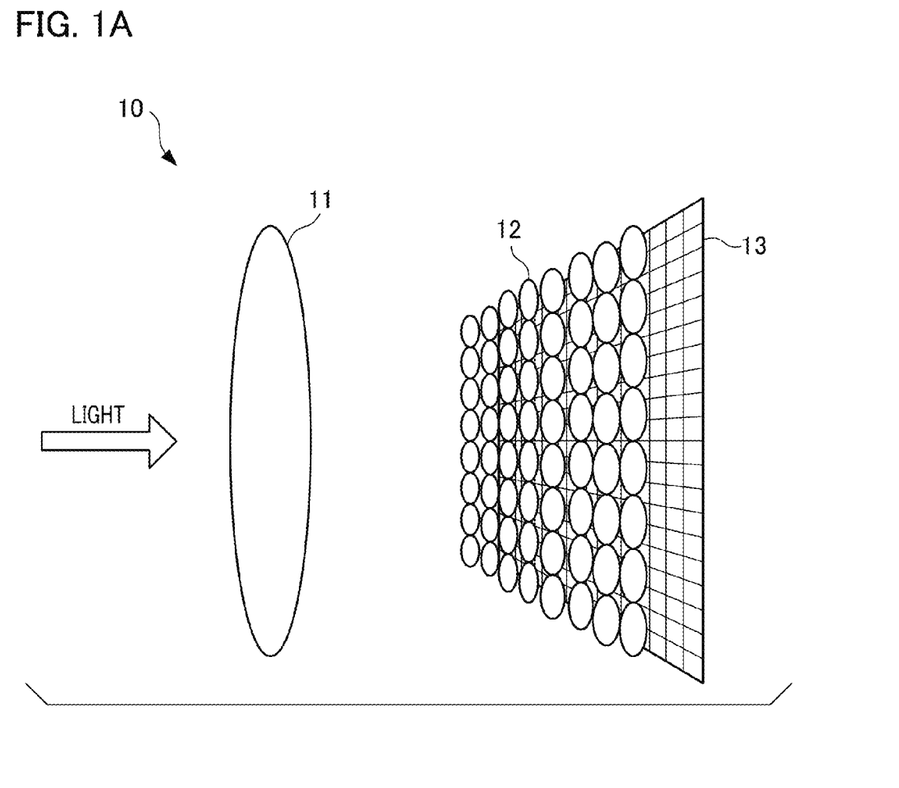
FIGS. 1A and 1B are schematic diagrams illustrating an example of the internal configuration of a light-field camera.
Figure 1B:
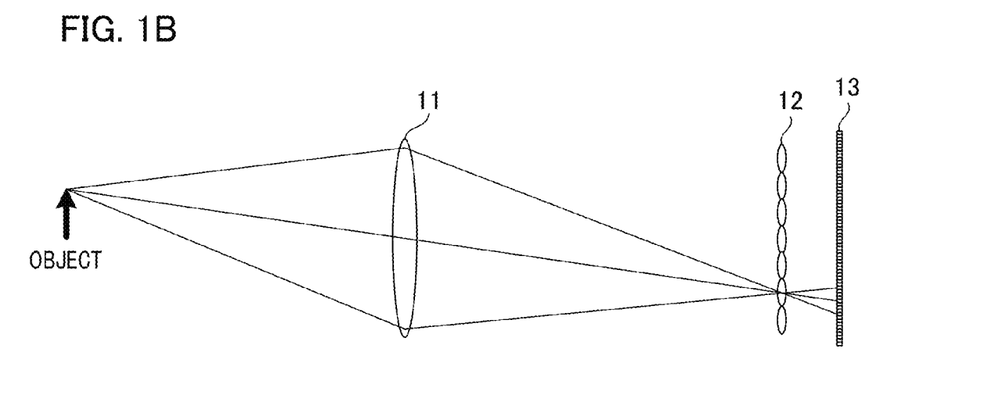

Before explaining the image processing apparatus according to the embodiments of the present invention, an imaging apparatus that is used in capturing a moving image for which the focus state can be specified will be explained. FIGS. 1A and 1B are schematic diagrams illustrating an example of the internal configuration of a LF camera. Light from an object, which is incident on a micro lens array 12 by passing through an imaging lens 11, is photoelectrically converted into an electrical signal by an image sensor 13. Note that the obtained imaging data is referred to as "light-field data" (hereinafter referred to as "LF data").

The imaging lens 11 projects light from an object onto the micro lens array 12. The imaging lens 11 is an interchangeable lens that is mounted to the main body of an imaging apparatus 10. A user can change an imaging magnification by the zoom operation of the imaging lens 11. The micro lens array 12 is configured by arranging a plurality of micro lenses in a grid and is located between the imaging lens 11 and the image sensor 13. Each of micro lenses constituting the micro lens array 12 divides incident light from the imaging lens 11 into divided light components and outputs the divided light components to the image sensor 13. The image sensor 13 constituting the imaging unit is an imaging element having a plurality of pixels, where the intensity of light is detected in each pixel. The respective lights divided by each micro lens are incident on each pixel of the image sensor 13 for receiving light from an object.

Figure 2:
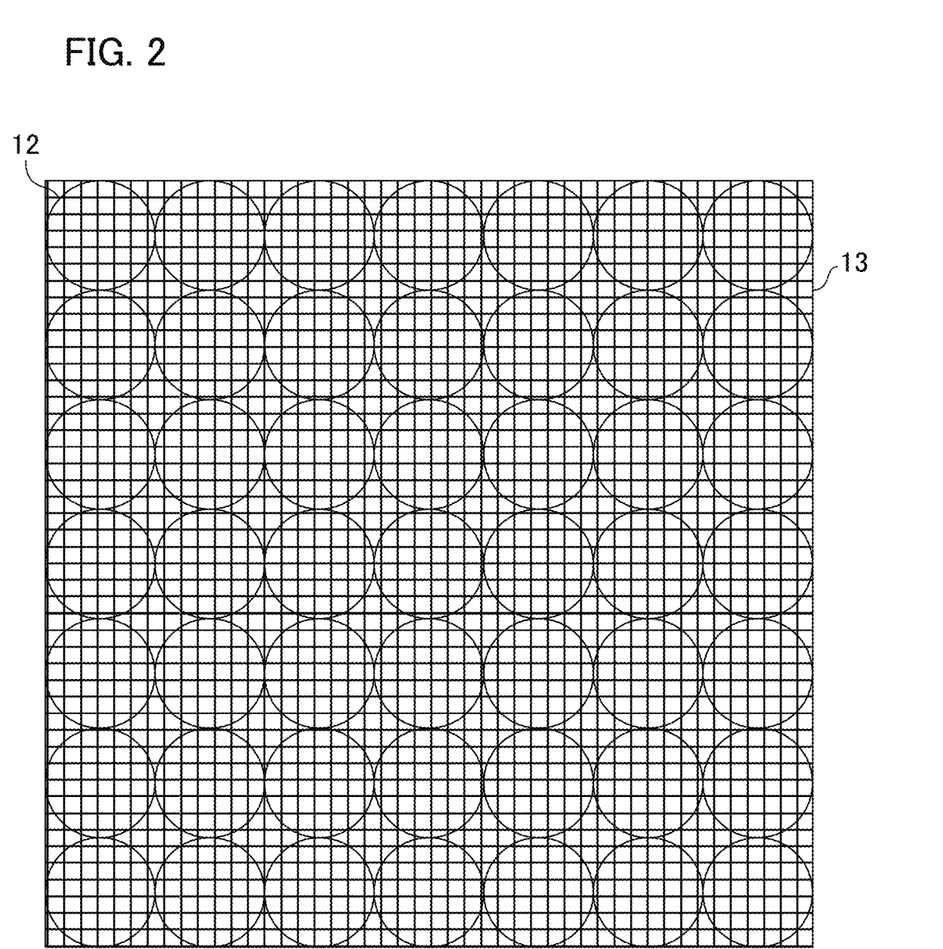
FIG. 2 is a schematic diagram illustrating the positional relationship between the micro lens array 12 and each pixel of the image sensor 13.

FIG. 2 is a schematic diagram illustrating the positional relationship between the micro lens array 12 and each pixel of the image sensor 13.

Each micro lens of the micro lens array 12 is arranged so as to correspond to a plurality of pixels of the image sensor 13. Light divided by each micro lens is incident on each pixel of the image sensor 13, and the intensity of light (light beam information) from different directions can be detected by each pixel. Also, the incidence direction (directional information) of a light beam incident on each pixel of the image sensor 13 via micro lenses can be found depending on the positional relationship between each micro lens and each pixel of the image sensor 13. In other words, information of the direction of travel of light is detected in conjunction with the intensity distribution of light. An image in a focal plane having different distances from the lens vertex surfaces of the micro lens array 12 is obtained by combining the outputs of the pixels of the image sensor 13, which are placed at positions corresponding to the eccentricity from the optical axis of each micro lens. Note that a light beam is represented by a function which is parameterized by parallel two planes using parameters such as a position, an orientation, a wavelength, or the like. In other words, the direction of light incident on each pixel is determined by the arrangement of a plurality of pixels corresponding to each micro lens.

As described above, the imaging apparatus 10 acquires light beam information and directional information performs light beam rearrangement/calculation processing (hereinafter referred to as "reconstruction") to thereby be able to generate image data of any focus position or any viewpoint. Light beam information and directional information are included in LF data.

Figure 3:
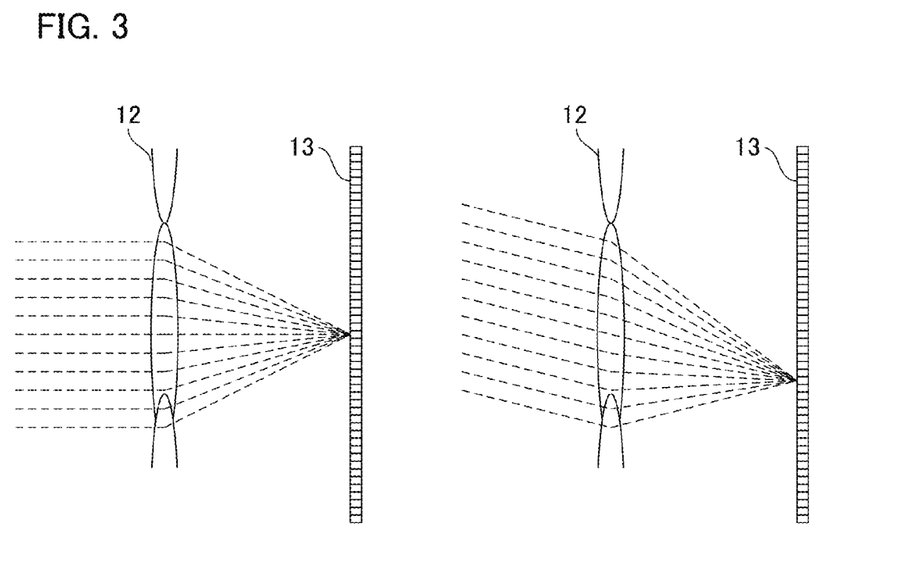
FIG. 3 is a schematic diagram illustrating the relationship between the direction of travel of a light beam incident on a micro lens and the recording area of the image sensor 13.

FIG. 3 is a schematic diagram illustrating the relationship between the direction of travel of a light beam incident on the micro lens of the micro lens array 12 and the recording area of the image sensor 13.

An object image formed by the imaging lens 11 is focused on the micro lens array 12, and a light beam incident on the micro lens array 12 is received by the image sensor 13 via the micro lens array 12. At this time, as shown in FIG. 3, a light beam incident on the micro lens array 12 is received at different positions on the image sensor 13 depending on the direction of travel of light, and thus, an object image having a shape similar to that of the imaging lens 11 is focused for each micro lens.

Figure 4:
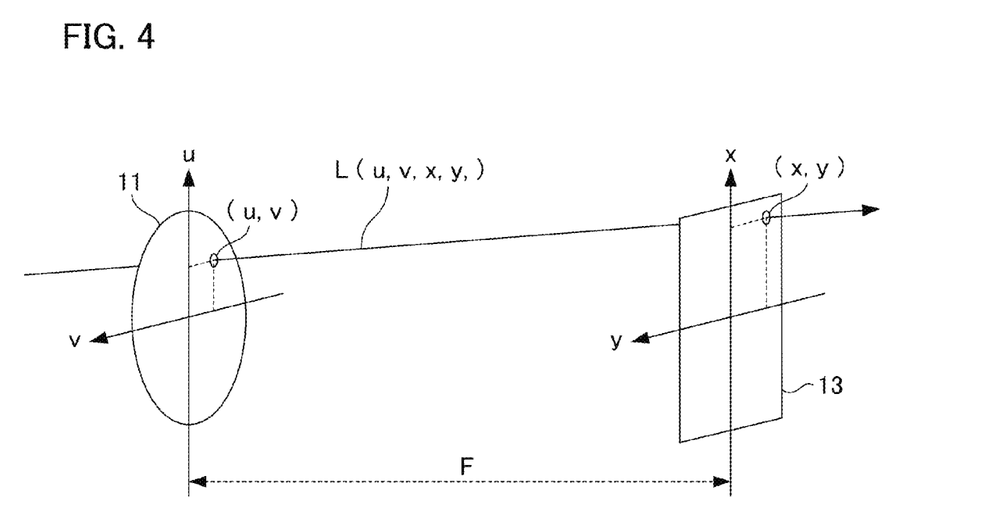
FIG. 4 is a schematic diagram illustrating information of a light beam incident on the image sensor 13.

FIG. 4 is a schematic diagram illustrating information of a light beam incident on the image sensor 13.

A description will be given of a light beam received by the image sensor 13 with reference to FIG. 4. Here, an assumption is made that the orthogonal coordinate system on the lens plane of the imaging lens 11 is given as (u, v), the orthogonal coordinate system on the imaging surface of the image sensor 13 is given as (x, y), and the distance between the lens plane of the imaging lens 11 and the imaging surface of the image sensor 13 is given as F. Thus, the intensity of a light beam passing through the imaging lens 11 and the image sensor 13 can be represented by the four-dimensional function L (u, v, x, y) as shown in FIG. 4.

Since a light beam incident on each micro lens is incident on different pixels depending on the direction of travel of light, not only light beam positional information but also the four-dimensional function L (u, v, x, y) for holding the direction of travel of a light beam are recorded on the image sensor 13.

Figure 5:
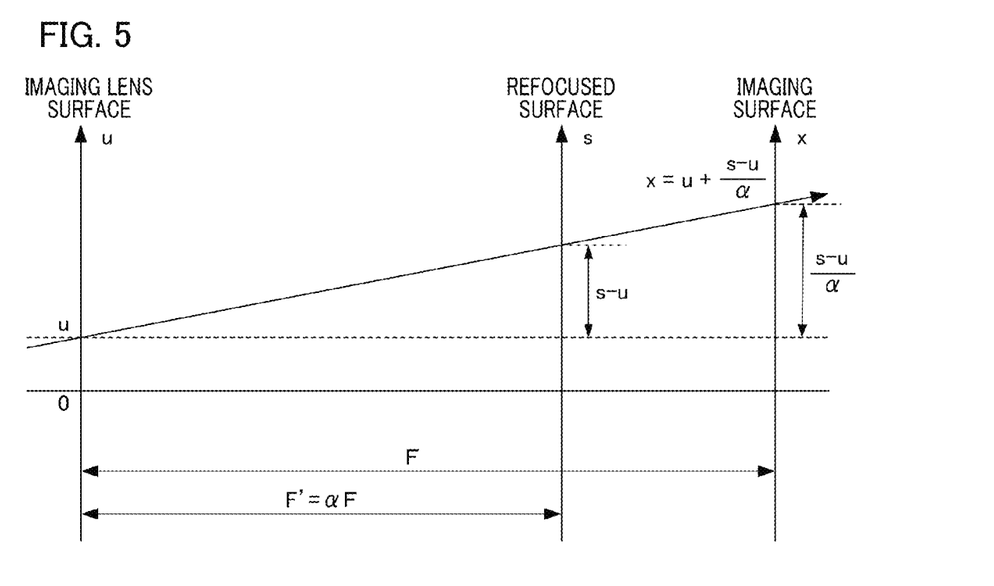
FIG. 5 is a schematic diagram illustrating refocusing arithmetic processing.

Next, a description will be given of refocusing arithmetic processing after imaging. FIG. 5 is a schematic diagram illustrating refocusing arithmetic processing. When the positional relationship among the imaging lens surface, the imaging surface, and the refocused surface is set as shown in FIG. 5, the intensity L' (u, v, s, t) of a light beam in the orthogonal coordinate system (s, t) on the refocused surface is represented by the following Formula (1).

$$L'(u, v, s, t) = L\left(u, v, u + \frac{s-u}{\alpha}, v + \frac{t-v}{\alpha}\right) \quad (1)$$

Also, since an image E'(s, t) obtained on a refocused surface is obtained by integrating the intensity L' (u, v, s, t) with respect to the lens aperture, the image E'(s, t) is represented by the following Formula (2).

$$E'(s, t) = \frac{1}{\alpha^2 F^2} \int \int L\left(u, v, u + \frac{s-u}{\alpha}, v + \frac{t-v}{\alpha}\right) du\, dv \quad (2)$$

Thus, refocusing arithmetic processing is performed by using Formula (2), so that an image set to any focus point (refocused surface) can be reconstructed.

Next, a description will be given of depth of field adjustment processing after imaging. Prior to refocusing arithmetic processing, weighting is performed by multiplying a weighting factor for each image data that forms an image region assigned to each micro lens. For example, when an image with a deep depth of field wants to be generated, integration processing is performed only by using information of a light beam incident on the light receiving surface of the image sensor 13 at a relatively small angle. In other words, for a light beam incident on the image sensor 13 at a relatively large angle, integration processing is not performed by multiplying a weighting factor "0" (zero).

Figure 6:
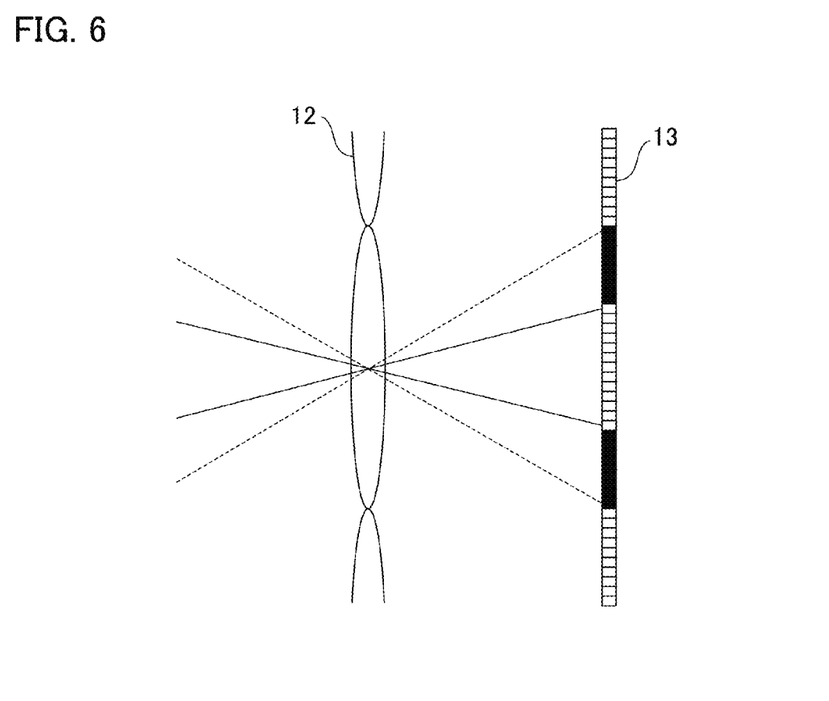
FIG. 6 is a schematic diagram illustrating the relationship between the difference in angle of incidence on a micro lens and the recording area of the image sensor 13.
Figure 7:
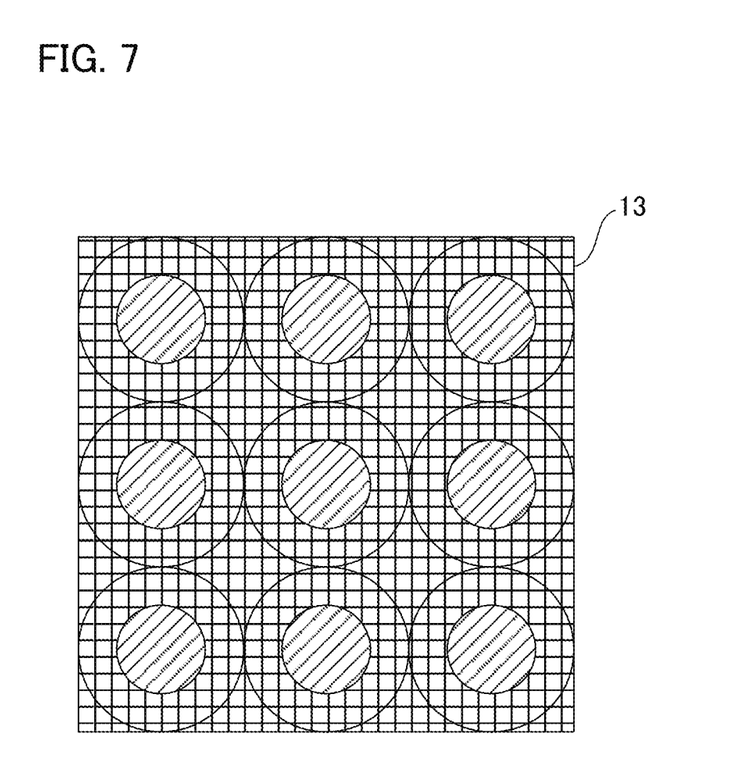
FIG. 7 is a schematic diagram illustrating depth of field adjustment processing.

FIG. 6 is a schematic diagram illustrating the relationship between the difference in angle of incidence on a micro lens and the recording area of the image sensor 13. FIG. 7 is a schematic diagram illustrating depth of field adjustment processing.

As shown in FIG. 6, a light beam of which the angle of incidence to the image sensor 13 is relatively small is positioned at more central region. Thus, as shown in FIG. 7, integration processing is performed only by using pixel data acquired by the central portion (hatched portion in FIG. 7) of the region. With the aid of such processing, an image with a deep depth of field can be expressed as if an aperture diaphragm provided in a typical imaging apparatus is closed. A deep focus image (pan focus image) with a deeper depth of field can also be generated by further reducing pixel data for use at the central portion of the region. As described above, the depth of field of an image after shooting can be adjusted based on the actually acquired LF data (light beam information).

First Embodiment

Figure 8:
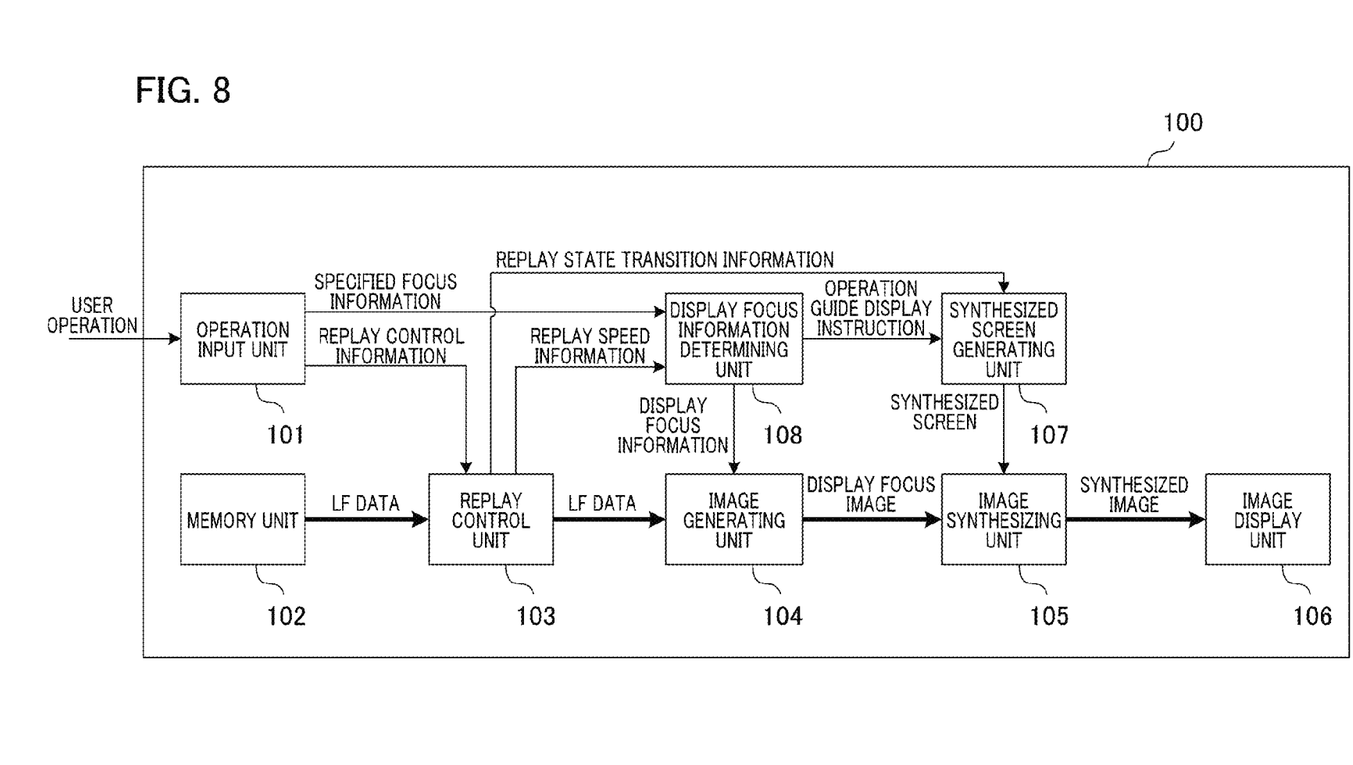
FIG. 8 is a block diagram illustrating an example of a configuration of an image replay apparatus in order to explain a first embodiment of the present invention.

FIG. 8 is a block diagram illustrating an example of a configuration of an image replay apparatus 100 according to a first embodiment of the present invention. The operation input unit 101 receives input signals input by a user operation. The operation input unit 101 outputs replay control information for specifying or changing a replay speed to the replay control unit 103, and outputs specified focus information for specifying a focus position to a display focus information determining unit 108. The specified focus information includes information such as the focal distance and depth of field according to the specified focus state. For example, this may include information that shows the focus state that is automatically focus controlled during autofocus imaging or information that shows the focus state that a user has manually specified during manual focus shooting. The memory unit 102 stores and holds the moving image LF data.

The replay control unit 103 reads out the moving image LF data from the memory unit 102 and outputs this to an image generating unit 104. The replay control information form the operation input unit 101 includes replay speed information, and the replay control unit 103 controls the frames that are read out and the read-out speed according to the replay speed information. In the case in which the replay speed is specified or changed, the replay control unit 103 outputs the transition information in the replay state to a synthesized screen generating unit 107 in order to display information about the replay speed on the screen. In addition, the replay control unit 103 outputs replay speed information to the display focus information determining unit 108 in order to determine the focus information for the image that is displayed.

The image generating apparatus 104 implements the above refocusing arithmetic processing and depth of field adjustment processing with respect to the moving image LF data input from the replay control unit 103, and reconstructs the image. At this time, reconstruction of the image is carried out according to the display focus information input from the display focus information determining unit 108, and the generated image is output to the image synthesizing unit 105 as data for an image (video) having a desired focus state.

The image synthesizing unit 105 generates image data by synthesizing the image (video) input from the image generating unit 104 and the synthesized screen input from the synthesized screen generating unit 107 and outputs the image data to the image display unit 106. The image display unit 106 is, for example, a liquid crystal panel or a plasma display or the like, and an image is displayed according to the image data output by the image synthesizing unit 105.

The synthesized screen generating unit 107 generates data of a replay speed display screen that displays the replay speed information according to the transition information of the replay state from the replay control unit 103, and outputs to the image synthesizing unit 105. In addition, the synthesized screen generating unit 107 generates data for an operation guide display screen for focus information changes in the case in which an operation guide display instruction has been input from the display focus information determining unit 108, and outputs to the image synthesizing unit 105. Note that control may be carried out such that the synthesized screen generated by the synthesized screen generating unit 107 is displayed in the image display unit 106 and this is cleared after a given period of time has elapsed.

The display focus information determining unit 108 determines the focus information (display focus information) of the displayed image based on the specified focus information from the operation input unit 101 and the replay speed information from the replay control unit 103, and outputs the result of the determination to the image generating unit 104. In addition, the display focus information determining unit 108 determines the presence or absence of an operation guide display instruction according to a change in the display focus information, and outputs the results of the determination to the synthesized screen generating unit 107. In this context, the specification of is carried out focus information made by a user during the display of the operation guide display screen 24 that is shown in FIG. 10(C) in the case in which an instruction signal is input by a vertical direction button operation in the operation input unit 101. At this time, the focus information is changed. During replay at the normal replay speed as well, the operation guide display screen 24 be can displayed at an arbitrary timing in the case in which a display operation for the operation guide display screen is carried out by the operation input unit 101. Note that the detailed operation of the display focus information determining unit 108 will be explained below.

Figure 9:
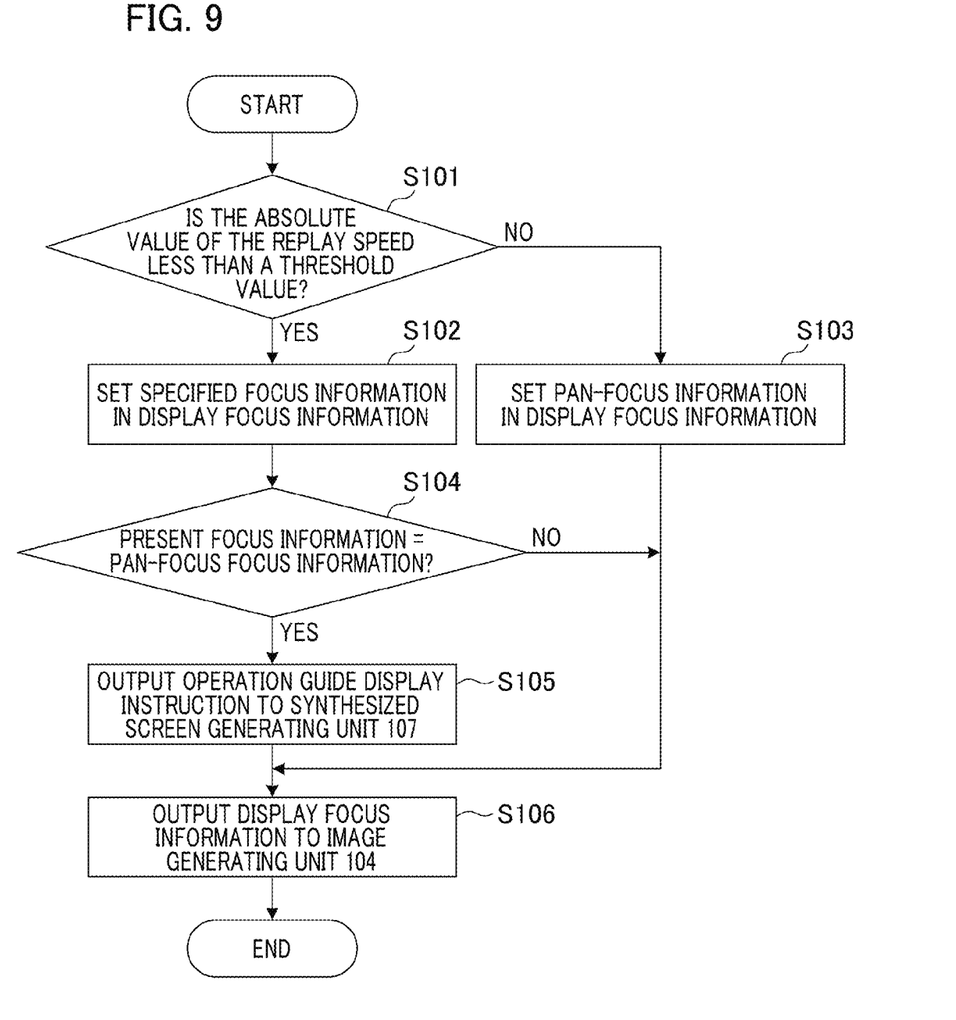
FIG. 9 is a flowchart for explaining the action of the display focus information determining unit 108 in FIG. 8.

FIG. 9 is a flowchart illustrating an example of the determination process that is carried out by the display focus information determining unit 108. The start condition for the determination process of the display focus information is that there is an input of specified focus information from the operation input unit 101, or that there is an input of replay speed information from the replay control unit 103. The display focus information determining unit 108 starts the process in the case in which the above start conditions have been satisfied, and compares the absolute value of the replay speed with a threshold value and determines whether or not the absolute value of the replay speed is equal to or greater than the threshold value, based on the replay speed information from the replay control unit 103 (S101). The "threshold value" illustrates that the user specifies focus information, and a minimum value of the replay speed at which recognition of the image is difficult when the user carries out a change operation. Note that the threshold value is not a fixed value, but may be arbitrarily set by a user.

In the case in which the absolute value of the replay speed is less than the threshold value, the display focus information determining unit 108 sets the focus information (specified focus information) that the user has specified using the operation input unit 101 as focus information (display focus information) for a displayed image (S102). In contrast, in the case in which the replay speed is equal to or greater than the threshold value, the display focus information determining unit 108 sets the pan-focus information as the display focus information (S103), and proceeds to S106. "Pan-focus information" denotes focus information related to a pan-focus image in which a plurality of subjects is in focus. A pan-focus image is an image in the case of a deep field of focus in which naturally the subject within a predetermined focus area is in focus in a wide depth range that includes subjects outside this area are also in focus. By displaying a pan-focus image, the user can easily recognize subjects across a wide range, and thus, during a search, overlooking desired scenes can be avoided.

After S102, the processing proceeds to S104, and the display focus information determining unit 108 determines whether or not the current focus information is pan-focus information. In the case in which the current focus information is pan-focus information, the processing proceeds to S105, and in the case in which the current focus information is not pan-focus information, the processing proceeds to S106.

In the case in which the current information is pan-focus information, as a condition for the user to change from a replay speed that is equal to or greater than a threshold value to a replay speed that is less than a threshold value, for example, assume that the search for a desired scene has been completed. In this case, when switching from the pan-focus information to the specified focus information, the display focus information determining unit 108 shows the display instruction for the focus information change in the operation guide display screen 24 to the synthesized screen generating unit 107 so that the user can easily change the focus information (S105). Next, the display focus information determining unit 108 outputs the display focus information to the image generating unit 104 (S106).

Figure 10A:
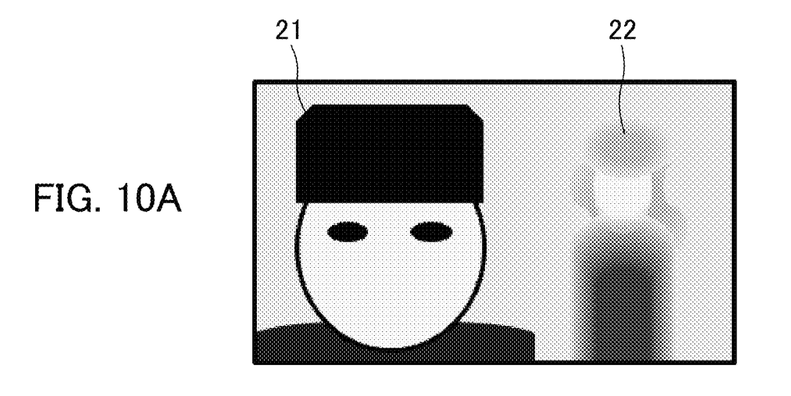
FIG. 10A is a diagram illustrating an example of a screen during normal replay.
Figure 10B:
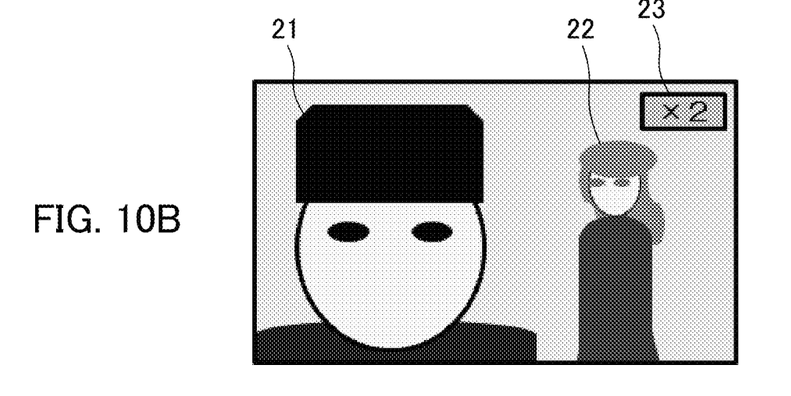
FIG. 10B is a diagram illustrating an example of a screen when switching from normal replay to double speed replay.
Figure 10C:
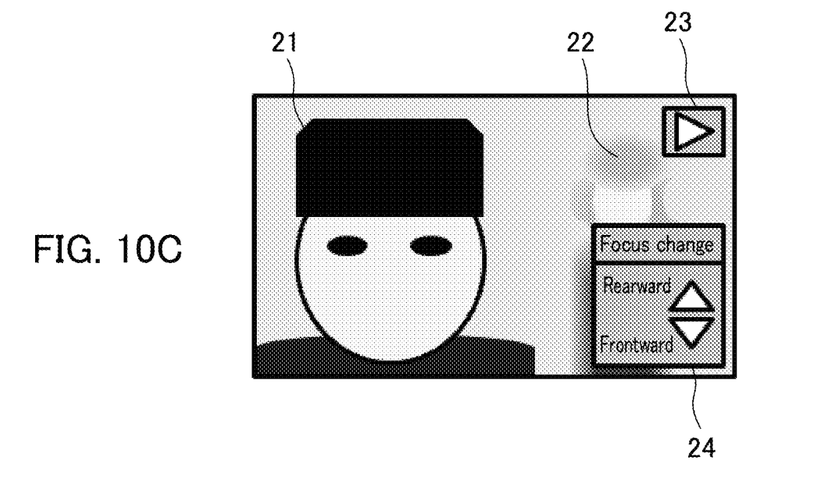
FIG. 10C is a diagram illustrating an example of a screen when switching from double speed replay to normal replay.

FIGS. 10A to 10C are diagrams illustrating examples of the screen when switching the replay speed. The figures exemplify the case in which the threshold value shown in S101 of FIG. 9 is set to a value corresponding to a 1.5 times speed replay, the replay speed is changed from the state of normal replay (1 times speed replay) to double speed, and then the speed is switched to one times speed. Note that the specified focus information is information for focusing on a first subject 21, and does not focus on the second subject. An image that is reconstructed by using the specified focus information is an image having a shallow depth of field in which a narrow depth range of a subject specified by a user is in focus.

FIG. 10A is an example of a screen during normal replay. In this case, because the replay speed is less than the threshold (1.5 times speed), the display focus information determining unit 108 determines that the display focus information is specified focus information. Thus, the focus information specified by a user operation is reflected in the display image.

FIG. 10B is an example of a screen when the changing from normal replay to double speed replay. In this case, because the replay speed is equal to or greater than a threshold value (1.5 times speed), the display focus information determining unit 108 determines that the display focus information is pan-focus information. Thus, the pan-focus information, in which a plurality of subjects is in focus, is reflected in the display image. Because the pan-focus image is replayed at double speed, in a state in which a subject 22 that not in focus during normal replay is also in focus, the user can recognize the subject 22. In addition, based on the transition information of the replay state from the replay control unit 103, the synthesized screen generating unit 107 generates data for the replay speed display screen 23, and this screen is synthesized with the display image.

FIG. 10C is an example of a screen when changing from double replay speed to normal replay speed. In this case, because the replay speed is less than a threshold value (1.5 times speed), the display focus information determination unit 108 determines that the display focus information is specified focus information. In addition, because the current focus information is pan-focus information, the synthesized screen generating unit 107 generates data for the operation guide display screen 24 according to an operation guide display instruction from the display focus information determining unit 108. In addition, based on the transition information of the replay state from the replay control unit 103, the synthesized screen generating unit 107 generates data for the replay speed display screen 23, and this screen (the display screen for the normal replay speed) is synthesized with the display image.

According to the first embodiment, during replay of moving image data for which an arbitrary focus state can be specified, in the case in which the replay speed is less than a threshold value, control is carried out in which a first image in the case of a shallow depth of field generated according to the specified focus state is replayed. In addition, in the case in which the replay speed is equal to or greater than a threshold value, control is carried out in which a second image in the case of a deep depth of field according to a pan-focus image in which a plurality of subjects are in focus is generated and replayed. Thereby, the user can easily recognize each subject, and overlooking a desired scene can be avoided. For example, fast-forward replay is used in order for a user to search for a desired scene from among a plurality of scenes, and because this differs from replay having the object of viewing an image, even if the display of a pan-focus image is carried out, the object of the scene search will be attained. In contrast, the case in which the replay is at normal speed or the replay speed is near normal speed, or the case in which the number of frames that skipped that is low, the user can recognize an image generated according to focus information specified in advance.

Note that in the present embodiment, as an acquisition apparatus for moving image LF data, an LF camera that detects light from different directions by detecting light divided by a micro lens array 12 is detected by an image sensor 13 has been exemplified. This is not limiting, and, for example, an embodiment in which light having different directions is detected by a multi-lens camera may be used. In addition, with respect to the replay speed, mainly a fast-forward speed was explained. However, the determination of display focus information and change processing according to this speed may also be carried out in rewind replay. Alternatively, in the case of a replay in which scenes and chapters are skipped, by determining the frame number or the time interval thereof, determination of focus information and change processing can be carried out. In this case, in the case in which the frame number of the image signals that are skipped during a scene search is less than a threshold value, control in which an image is generated and replayed according to specified focus information is carried out. In addition, in the case in which the number of frames of video signals that are skipped is equal to or greater than a threshold value, control in which an image is generated and replayed according to pan-focus information is carried out. These matters are identical in the embodiments to be described below.

Second Embodiment

Next, a second embodiment of the present invention will be explained. In the second embodiment, during fast forward replay of a moving image for which focus information can be specified, a process will be explained that simultaneously displays first image data in the case of a shallow depth of field based on the specified focus information and second image data in the case of a deep depth of field according to a pan-focus image in which a plurality of subjects are in focus. Note that detailed explanations are omitted by using reference numerals already used for the structural elements that are identical to the case of the first embodiment, and the points of difference will be explained in detail. Such a manner of omitting explanations is identical in the embodiments explained below.

Figure 11:
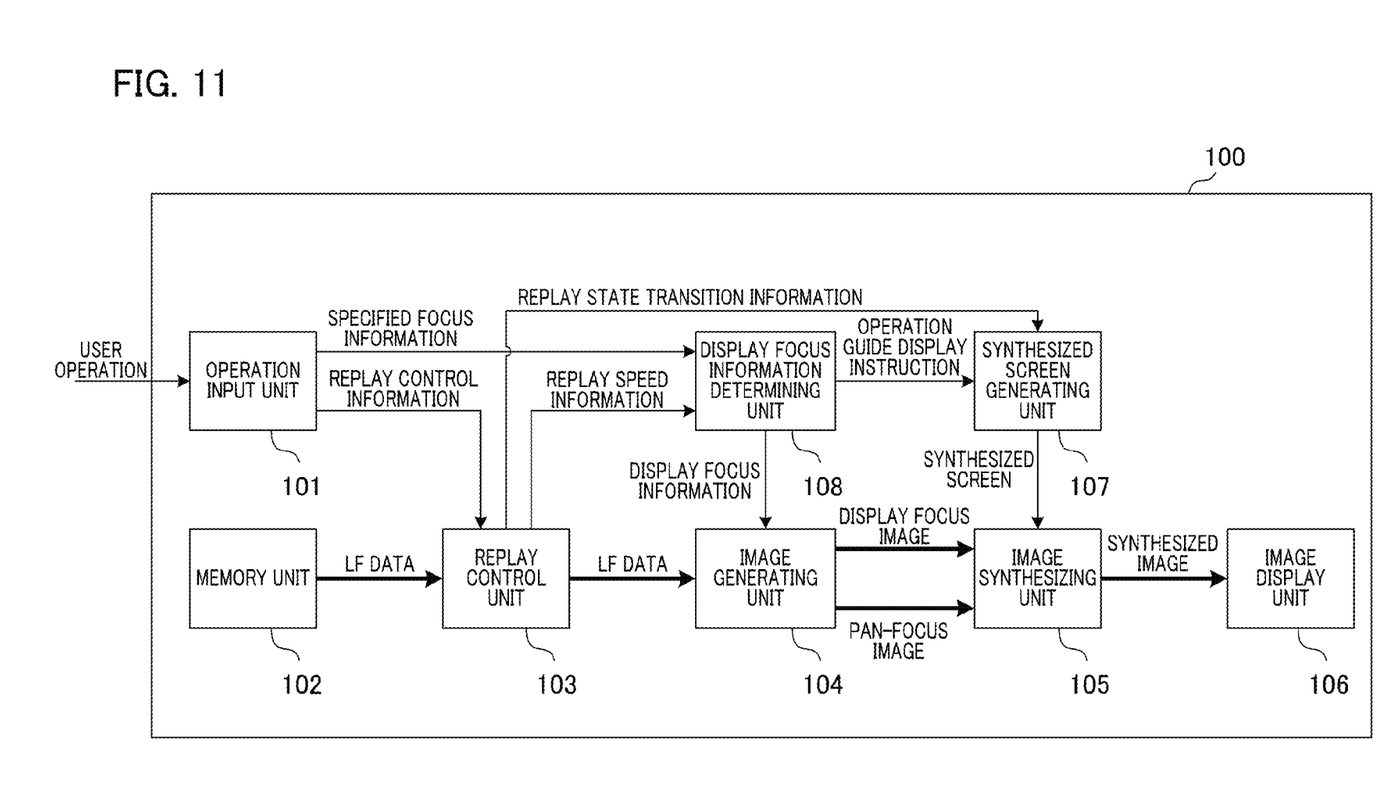
FIG. 11 is a block diagram illustrating an example of a configuration of an apparatus according to a second embodiment of the present invention.

FIG. 11 is a block diagram illustrating an example of a configuration of an image replay apparatus 100.

The image generating unit 104 reconstructs the image based on moving image LF data input from the replay control unit 103. At this time, an image (video) is generated based on the reconstruction according to the display focus information input from the display focus information determining unit 108. In the case in which the display focus information is pan-focus information, data for both the specified focus image and the pan-focus image currently being replayed are generated, and this data is output to the image generating unit 105. In addition, in the case in which the display focus information is not pan-focus information, only an image (video) according to the display focus information is generated, and this image is output to the image synthesizing unit 105.

The image synthesizing unit 105 generates image data that synthesizes the display focus video and the pan-focus video input from the image generating unit 104 with the synthesized screen input from the synthesized screen generating unit 107, and this is displayed in the image display unit 106. In the case in which there has been an input of two image data from the image generating unit 104, the image synthesizing unit 105 carries out screen control such that the two images are each displayed on two screens (divided display and PinP display and the like).

Figure 12:
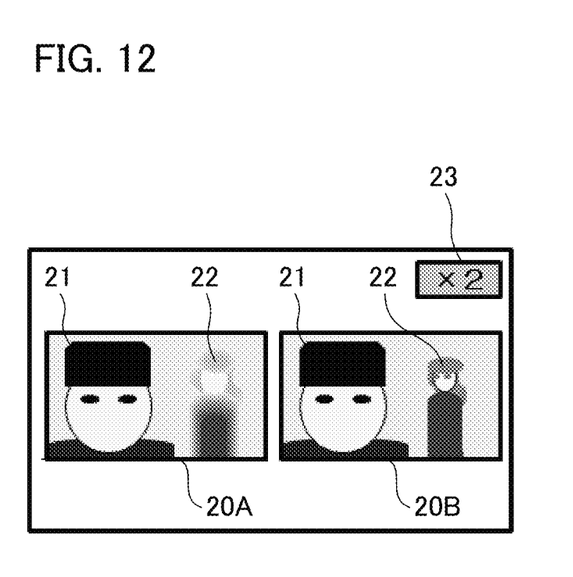
FIG. 12 is a diagram illustrating an example of a screen when the replay speed is switched from normal replay to double speed replay in a second embodiment of the present invention.

FIG. 12 illustrates an example of the screen when the replay speed has been changed. A case in shown in which the threshold value is a value that corresponds to a 1.5 times speed replay, and the normal replay state is switched to double speed. Note that the specified focus information is information for focusing on a first subject 21, and the second focus subject 22 is not in focus. In addition, because the examples of the screen during normal replay and the screen when switching from double speed replay to normal replay are identical to FIG. 10A and FIG. 10C, the explanations thereof are omitted.

FIG. 12 illustrates an example of a screen when switching from a normal replay to a double speed replay. In this case, because the replay speed is equal to or greater than the threshold value (1.5 times speed), the display focus information determining unit 108 determines that the display focus information is pan-focus information. Because the display focus information is pan-focus information, the image generating unit 104 simultaneously generates each of the data for the image 20A using the specified focus information and the pan-focus information 20B which are currently displayed. The image synthesizing unit 105 synthesizes an image in order to display the data for the input images 20A and 20B on two screens. At this time, the subject 22 that is not in focus during normal replay can be recognized because the user can simultaneously view the pan-focus image 20B. In addition, based on the transition information for the replay state from the replay control unit 103, the synthesized screen generating unit 107 generates the data for the replay speed display screen 23, and this screen is synthesized with the display image.

According to a second embodiment, a user can easily recognize a subject by simultaneously viewing a pan-focus image having a deep depth of field and an image that is generated by using the specified focus information and has a shallow depth of field, and thus, overlooking desired scene can be prevented.

Third Embodiment

Next a third embodiment of the present invention will be explained. In the third embodiment, processing that distinguishes the replay speed information and the display focus information from the image information will be explained.

Figure 13:
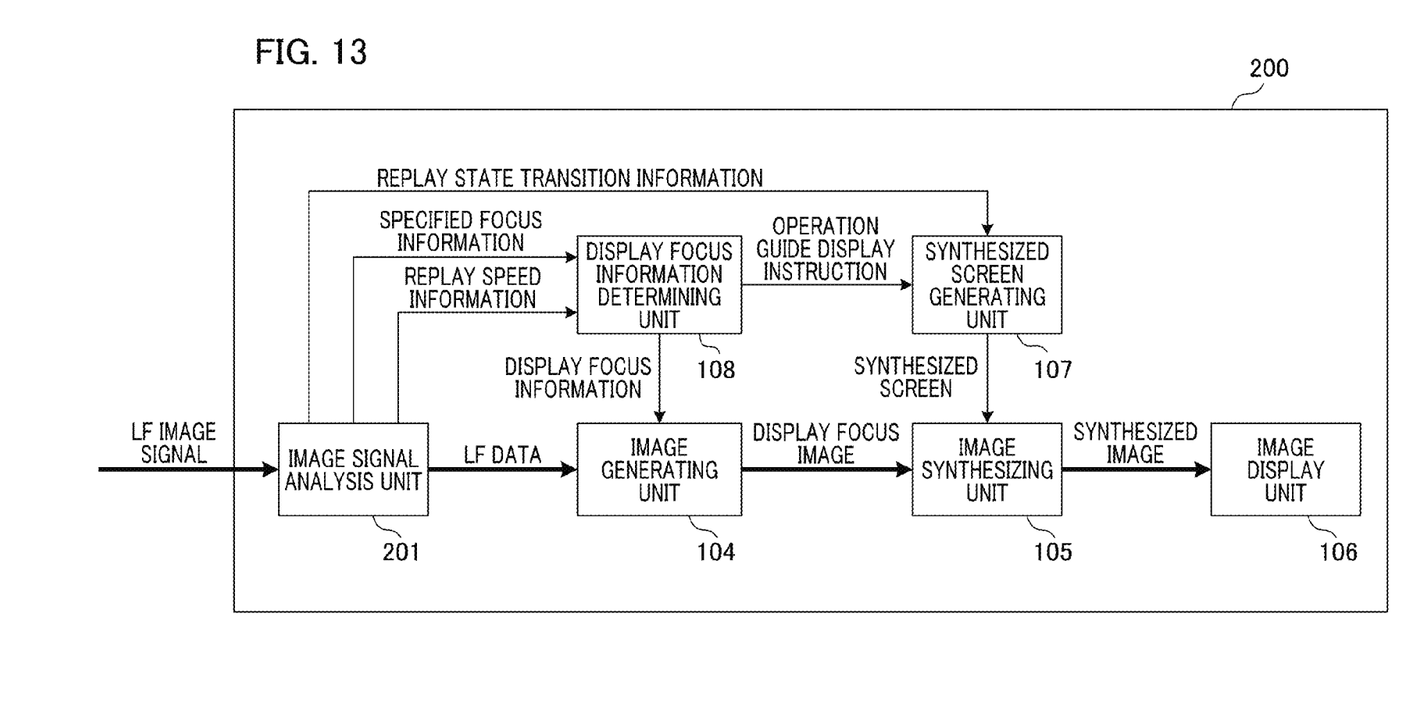
FIG. 13 is a block diagram illustrating an example of a configuration of an apparatus according to a third embodiment of the present invention.

FIG. 13 is a block diagram illustratings an example of an image display apparatus 200. The image signal analysis unit 201 analyzes the specified focus information from the supplementary information of the LF video signal that has been input, and analyzes the replay speed information based on the frame information of the LF video signal. The moving image LF data according to the LF video signal is output to the image generating unit 104, and the specified focus information and the replay speed information are output to the display focus information determining unit 108. In the case in which the replay speed is changed, the transition information for the replay state is output to the synthesized screen generating unit 107. In this context, LF video signal denotes an image signal to which, along with the moving image LF data, each type of information of the specified focus information and the frame information is added. Note that the format of the LF image signal is not limited by the above, and that various types of information may be added by other devices. The video signal analyzing unit 201 carries out the analysis according to the format of the LF video signal, and obtains the specified focus information and the replay speed information. Thereby, even in the case in which focus information and replay speed are specified by a means other than a user operation, identification and change processing of focus information can be carried out similarly to the above embodiment, and thus, the user can easily recognize the subject and overlooking a desired scene can be prevented.

According to the third embodiment, even in the case in which the replay speed information and the focus information have been specified by an outside apparatus, the specified focus information and the replay speed information can be obtained by analyzing the information related to the LF video signal.

The present invention may also be realized by executing the following processing. Specifically, software (program) for realizing the functions of the aforementioned embodiments is supplied to a system or an apparatus via a network or various types of storage mediums, and then the computer (or CPU, MPU, or the like) of the system or the apparatus reads out the program for execution.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179591 filed on Aug. 13, 2012, and Japanese Patent Application No. 2013-145490 filed on Jul. 11, 2013, which are hereby incorporated by reference herein in their entirety.

What is claimed is:

1. An image processing apparatus that replays light-field moving image data, comprising
an operation unit configured to specify focus information of the moving image including a focal distance and a depth of field;
a control unit configured to carry out control that replays the light-field moving image data; and
a generating unit configured to obtain the focal distance and the depth of field of the focus information specified by the operation unit and light ray information that shows the intensity of the light for each frame of the light-field moving image data and direction information for the light rays, and to generate an image having a depth of field and a focal distance depending on a replay speed of the light-field moving image data by reconstructing the image using obtained light ray information,
wherein the generating unit generates a first image having a shallow depth of field based on the light-field moving image data in a case where the replay speed is less than a threshold value, and generates a second image having a deeper depth of field than the first image based on the light-field moving image data in a case where the replay speed is equal to or greater than the threshold value, and
wherein a narrower depth range of a subject is in focus in the first image and the second image is a pan-focus image.

2. The image processing apparatus according to claim 1, wherein the control unit is configured to carry out control in which the first image and the second image are generated by the generating unit and replayed in the case in which the replay speed is equal to or greater than the threshold value.

3. The image processing apparatus according to claim 1, wherein the control unit is configured to analyze additional information for an image signal to obtain focus information, and
wherein the generating unit generates the first image data according to focus information obtained by analyzing the additional information.

4. The image processing apparatus according to claim 1, further comprising:
an operation unit configured to specify the replay speed,
wherein the control unit compares the replay speed specified by the operation unit with the threshold value.

5. The image processing apparatus according to claim 1, wherein the control unit is configured to analyze a replay speed based on frame information of an image signal and compare the result of the analysis with the threshold value.

6. The image processing apparatus according to claim 1, wherein the control unit is configured to carry out control in which, during an operation of fast forward replay, rewind replay, or scene searching, the second image is generated by the generating unit and replayed.

7. The image processing unit according to claim 1, wherein the control unit is configured to carry out control such that the first image is generated by the generating unit and replayed in the case where a frame number of a skipped image signals during scene searching is less than a threshold value, and to carry out control such that the second image is generated by the generating unit and replayed in the case where the frame number is equal to or greater than the threshold value.

8. A control method that is executed on an image processing apparatus that replays light-field moving image data, the method comprising:
controlling to replay the light-field moving image data;
specifying focus information of the moving image including a focal distance and a depth of field:
obtaining the focal distance and the depth of field of the focus information specified by an operation unit and light ray information that shows the intensity of the light for each frame of the light-field moving image data and direction information for the light rays;
generating an image having a depth of field and a focal distance depending on a replay speed of the light-field moving image data by reconstructing the image using obtained light ray information; and
generating a first image having a shallow depth of focus based on the light-field moving image data in a generating unit in the case where the replay speed is less than a threshold value, and generating a second image having a deeper depth of field than the first image based on the light-field moving image data by the generating unit in the case where the replay speed is equal to or greater than the threshold value,
wherein a narrower depth range of a subject is in focus in the first image and in focus in the second image is a pan-focus image.

9. The control method for an image processing apparatus according to claim 8, further comprising:
generating the first image data and the second image data by the generating unit and replaying in the case where the replay speed is equal to or greater than the threshold value.

10. The control method for an image processing apparatus according to claim 8, further comprising:
obtaining a focal distance and a depth of field as focus information specified by an operation unit, and generating the moving image data by the generating unit.

11. The control method for an image processing apparatus according to claim 8, further comprising:
analyzing additional information for an image signal to obtain focus information; and
generating the first image data by the generating unit according to the focus information obtained by analyzing the additional information.

12. The control method for an image processing apparatus disclosed in claim 8, further comprising:
comparing the replay speed specified by an operation unit with the threshold value.

13. The control method for an image processing apparatus according to claim 8, further comprising:
analyzing the replay speed based on frame information for an image signal; and
comparing the replay speed obtained by the analysis with the threshold value.

14. The control method for an image processing apparatus according to claim 8, further comprising:
generating the second image data by the generating unit and replaying the second image data during the operation of fast forward replay, rewind replay, or scene searching.

15. The control method for an image processing apparatus according to claim 8, further comprising:
controlling to generate the first image by the generating unit and to replay in the case where a frame number of a skipped image signal during scene searching is less than the threshold value, and
controlling to generate the second image by the generating unit and to replay the second image in the case where the frame number is equal to or greater than the threshold value.

16. A non-transitory computer-readable storage medium storing a program for causing a computer to execute the control method in an image processing apparatus that replays light-field moving image data, the method comprising:
controlling to replay the light-field moving image data;
specifying focus information of the moving image including a focal distance and a depth of field;
obtaining the focal distance and the depth of field of the focus information specified by an operation unit and light ray information that shows the intensity of the light for each frame of the light-field moving image data and direction information for the light rays;
generating an image having a depth of field and a focal distance depending on a replay speed of the light-field moving image data by reconstructing the image using obtained light ray information;

generating a first image having a shallow depth of focus based on the light-field moving image data in a case where the replay speed is less than a threshold value; and generating a second image having a deeper depth of field than the first image based on the light-field moving image data in a case where the replay speed is equal to or greater than the threshold value, wherein a narrower depth range of a subject is in focus in the first image and in the second image is a pan-focus image.

* * * * *